United States Patent
Nishiumi et al.

(10) Patent No.: US 11,805,786 B2
(45) Date of Patent: Nov. 7, 2023

(54) METHOD FOR PRODUCING COFFEE EXTRACT LIQUID

(71) Applicant: SUNTORY HOLDINGS LIMITED, Osaka (JP)

(72) Inventors: Toshihiro Nishiumi, Kanagawa (JP); Nao Kamezawa, Kanagawa (JP); Atsushi Mukai, Kanagawa (JP); Takashi Mukai, Kyoto (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 237 days.

(21) Appl. No.: 17/297,144

(22) PCT Filed: Jun. 4, 2019

(86) PCT No.: PCT/JP2019/022223
§ 371 (c)(1),
(2) Date: May 26, 2021

(87) PCT Pub. No.: WO2020/110353
PCT Pub. Date: Jun. 4, 2020

(65) Prior Publication Data
US 2022/0030903 A1    Feb. 3, 2022

(30) Foreign Application Priority Data
Nov. 29, 2018   (JP) ................. 2018-224229

(51) Int. Cl.
*A23F 5/26*   (2006.01)
*A23F 5/28*   (2006.01)

(52) U.S. Cl.
CPC .............. *A23F 5/262* (2013.01); *A23F 5/285* (2013.01)

(58) Field of Classification Search
CPC ................................ A23F 5/262; A23F 5/285
See application file for complete search history.

(56) References Cited

U.S. PATENT DOCUMENTS

| 4,129,665 A | 12/1978 | Clark |
| 4,277,509 A | 7/1981 | Wouda |
| 5,204,136 A | 4/1993 | Hellemons |
| 2006/0083845 A1* | 4/2006 | Smits ...................... A23F 5/285 426/594 |

(Continued)

FOREIGN PATENT DOCUMENTS

| JP | 47-020370 A | 9/1972 |
| JP | 47-025360 A | 10/1972 |

(Continued)

OTHER PUBLICATIONS

International Search Report dated Sep. 3, 2019, issued in counterpart application No. PCT/JP2019/022223 (2 pages).

*Primary Examiner* — Anthony J Weier
(74) *Attorney, Agent, or Firm* — WHDA, LLP (57) ABSTRACT

A method for producing a coffee extract with increased coffee-specific aroma and reduced off-flavors is provided. A coffee extract prepared by extraction at low temperature (70 to 120° C.) in the first extraction step is mixed with a coffee extract prepared by an evaporative concentration treatment after the second extraction step, in which roasted and ground coffee beans used in the first extraction step is used for extraction at high temperature (125 to 150° C.).

6 Claims, 2 Drawing Sheets

(56) References Cited

U.S. PATENT DOCUMENTS

| | | | |
|---|---|---|---|
| 2014/0147562 A1* | 5/2014 | Heijman | A23F 5/46 |
| | | | 426/594 |
| 2015/0327567 A1 | 11/2015 | Heijman et al. | |
| 2016/0029655 A1 | 2/2016 | Heijman et al. | |
| 2017/0295814 A1* | 10/2017 | Smits | A23F 5/285 |
| 2017/0295815 A1* | 10/2017 | Smits | A23F 5/26 |

FOREIGN PATENT DOCUMENTS

| | | | |
|---|---|---|---|
| JP | 52-125670 A | | 10/1977 |
| JP | 2-119748 A | | 5/1990 |
| JP | 2014-521346 A | | 8/2014 |
| JP | 2016-504923 A | | 2/2016 |
| JP | 2018-500040 A | | 1/2018 |
| JP | 2018-113986 A | | 7/2018 |
| WO | WO2007/043873 | * | 4/2007 |

* cited by examiner

METHOD FOR PRODUCING COFFEE EXTRACT LIQUID

TECHNICAL FIELD

The present invention relates to a method for producing a coffee extract and the like. More specifically, the present invention relates to a method for producing a coffee extract with increased coffee-specific aroma and reduced off-flavors, and the like.

BACKGROUND ART

There is a desire to obtain a high concentration coffee extract from a usual raw material of coffee, from which a coffee-specific aroma can be felt and in which off-flavors are reduced. Methods for producing a coffee extract having such characteristics have been considered.

For example, Patent Literature 1 discloses a method for producing a high concentration coffee extract, in which a hot aqueous medium is passed through a pair of extraction columns (percolator columns) and an extraction step is combined with an evaporative concentration step. Furthermore, Patent Literature 2 discloses a method for producing a high concentration coffee extract by passing hot water through a pair of extraction columns.

Meanwhile, since usual raw materials of coffee contain a large amount of off-flavor components, not only good coffee-specific aroma but also the off-flavor components are extracted when coffee is extracted from the materials by a usual method. Extraction of off-flavor components is also a problem even in a method for extracting a coffee extract at high concentration using a continuous multi-tube extractor. Under such circumstances, providing a coffee extract with increased coffee-specific aroma and reduced off-flavors has been desired.

CITATION LIST

Patent Literature

PTL 1: Japanese Patent Application Laid-Open No. 47-20370
PTL 2: Japanese Patent Application Laid-Open No. 52-125670

SUMMARY OF INVENTION

Technical Problem

An object of the present invention is to produce a coffee extract with increased coffee-specific aroma and reduced off-flavors, and the like.

Solution to Problem

The present inventors have conducted intensive studies to solve the above problem, and as a result have shown that excellent coffee-specific aroma is maintained when extraction is performed at a relatively low temperature in the first extraction step. Furthermore, the present inventors have shown that in the second extraction step, a high concentration coffee extract with reduced off-flavors can be produced by extraction at a relatively high temperature using roasted and ground coffee beans used in the first extraction step to increase the concentration of the coffee extract and by removing off-flavor components by evaporative concentration. The present inventors have also found, for example, that a coffee extract with increased coffee-specific aroma and reduced off-flavors can be obtained by mixing coffee extract prepared in the first extraction step with coffee extract evaporated and concentrated after the second extraction step, and have completed the present invention.

That is, the present invention relates to the following, but is not limited thereto.

(1) A method for producing a coffee extract, comprising:
   a) a first extraction step in which water at 70 to 120° C. is supplied to a column packed with roasted and ground coffee beans at a flow rate of 1.0 to 10.0 kg/h per 1 L of the capacity of the column to prepare 0.05 to 0.50 kg of a coffee extract per 1 L of the capacity of the column;
   b) a second extraction step in which water at 125 to 150° C. is supplied to the column packed with roasted and ground coffee beans used in the first extraction step at a flow rate of 1.0 to 10.0 kg/h per 1 L of the capacity of the column to prepare 0.5 to 5.0 kg of a coffee extract per 1 L of the capacity of the column;
   c) a step of evaporating and concentrating the coffee extract prepared in the second extraction step; and
   d) a step of mixing the coffee extract prepared in the first extraction step with the evaporated and concentrated coffee extract.

(2) The method according to (1), wherein the column used in the first extraction step is a plurality of columns serially connected.

(3) The method according to (1) or (2), wherein the extraction temperature in the first extraction step is 90 to 110° C.

(4) The method according to any of (1) to (3), wherein the column used in the second extraction step is a plurality of columns serially connected.

(5) The method according to any of (1) to (4), wherein the extraction temperature in the second extraction step is 125 to 140° C.

(6) The method according to any of (1) to (5), further comprising: after preparing a coffee extract in the second extraction step, discarding the extracted roasted and ground coffee beans in the column; washing the column; and packing new roasted and ground coffee beans in the column after washing, wherein the column packed with new roasted and ground coffee beans is used in a subsequent first extraction step.

(7) The method according to any of (1) to (6), further comprising:
   after the step a), a step a') of fractionating the coffee extract prepared in the first extraction step into an extract rich in a volatile aromatic component (aroma) and extract residue; and
   after the step b), a step b) of mixing the extraction residue with a coffee extract prepared in the second extraction step,
   wherein in the step c), the mixture of the extraction residue with the coffee extract prepared in the second extraction step is evaporated and concentrated, and
   in the step d), part or all of the extract rich in a volatile aromatic component (aroma) obtained in the step a') is mixed with the evaporated and concentrated mixture.

(8) A method for increasing coffee-specific aroma and reducing off-flavors in a coffee extract, comprising:
   a) a first extraction step in which water at 70 to 120° C. is supplied to a column packed with roasted and ground coffee beans at a flow rate of 1 to 10 kg/per 1 L of the capacity of the column to prepare 0.05 to 0.50 kg of a coffee extract per 1 L of the capacity of the column;

b) a second extraction step in which water at 125 to 150° C. is supplied to the column packed with roasted and ground coffee beans used in the first extraction step at a flow rate of 1 to 10 kg/h per 1 L of the capacity of the column to prepare 0.5 to 5.0 kg of a coffee extract per 1 L of the capacity of the column;

c) a step of evaporating and concentrating the coffee extract prepared in the second extraction step; and d) a step of mixing the coffee extract prepared in the first extraction step and the evaporated and concentrated coffee extract.

Advantageous Effects of Invention

The present invention can produce a coffee extract with increased coffee-specific aroma and reduced off-flavors.

DESCRIPTION OF EMBODIMENTS

1. Method for Producing Coffee Extract

In an embodiment, the present invention is a method for producing a coffee extract, comprising a) a first extraction step in which water at 70 to 120° C. is supplied to a column packed with roasted and ground coffee beans to prepare a coffee extract; b) a second extraction step in which water at 125 to 150° C. is supplied to the column packed with roasted and ground coffee beans used in the first extraction step to prepare a coffee extract; c) a step of evaporating and concentrating the coffee extract prepared in the second extraction step; and d) a step of mixing the coffee extract prepared in the first extraction step with the evaporated and concentrated coffee extract. This makes it possible to produce a coffee extract with increased coffee-specific aroma and reduced off-flavors. In the present description, the "coffee-specific aroma" means sweet smell of freshly ground coffee.

1-1. Roasted and Ground Coffee Beans

In the present description, "roasted and ground coffee beans" mean those prepared by grinding coffee beans after a step of heating and roasting raw coffee beans, i.e., a "step of roasting". In the present invention, the production area and the variety of coffee beans used for preparing roasted and ground coffee beans are not particularly limited. Examples of production areas of coffee beans include Brazil. Columbia. Tanzania, Mocha, Kilimanjaro, Mandheling and Blue Mountain. Examples of varieties of coffee beans include Arabica, Robusta and Liberica. Coffee beans from one production area or coffee beans of one variety may be used, or those from different production areas or of different varieties may be used in combination. Although the variety of coffee beans used in the method for producing the coffee extract of the present invention is not particularly limited, it is preferable to use Arabica and Robusta coffee beans.

In the present invention, the method of roasting and conditions of roasting for preparing roasted coffee beans from raw coffee beans are not particularly limited. For example, in a method such as a direct heat method, a hot air method, a semi-hot air method, a char-grill method, a far-infrared method, a microwave method or a superheated steam method, an apparatus such as a horizontal (lateral) drum type, a vertical (longitudinal) drum type, a vertically rotating ball type, a fluidized bed type and a pressurization type may be used. Coffee beans may be finished at a degree of roast (light, cinnamon, medium, high, city, full-city, French, Italian) suited to the predetermined purpose depending on the type of beans.

For the roasted and ground coffee beans used in the present invention, the roasting temperature for preparing roasted coffee beans is not particularly limited. The roasting temperature is preferably 100 to 300° C., more preferably 150 to 250° C. particularly preferably 170 to 220° C. The roasting time for preparing roasted coffee beans is also not particularly limited, and is preferably 5 to 30 minutes, more preferably 10 to 25 minutes, and particularly preferably 15 to 20 minutes. The degree of roast for the roasted coffee beans is not particularly limited, and coffee beans are roasted so that the degree of roast is preferably 10 to 30, more preferably 10 to 25, and particularly preferably 15 to 25 in the L value measured by a color difference meter as an index. For the measurement of the degree of roast, ground beans are introduced into a cell and thoroughly tapped to measure the degree of roast by a spectro color meter. SE-2000 made by Nippon Denshoku Industries, Co., Ltd. and the like may be used as a spectro color meter.

The method of grinding for obtaining roasted and ground coffee beans of the present invention is not particularly limited, and a usual method such as dry grinding or wet drying may be used.

1-2. Coffee Extract

In the present description, the "coffee extract" means liquid extracted from coffee beans. Examples of coffee extracts include an extract prepared by extraction of roasted coffee beans with a solvent such as water, those prepared by diluting or concentrating the extract, and slurry containing coffee beans or ground coffee beans. A coffee drink may be prepared by diluting the "coffee extract" as needed and optionally mixing it with other raw materials.

1-3. First Extraction Step

Figure 1:
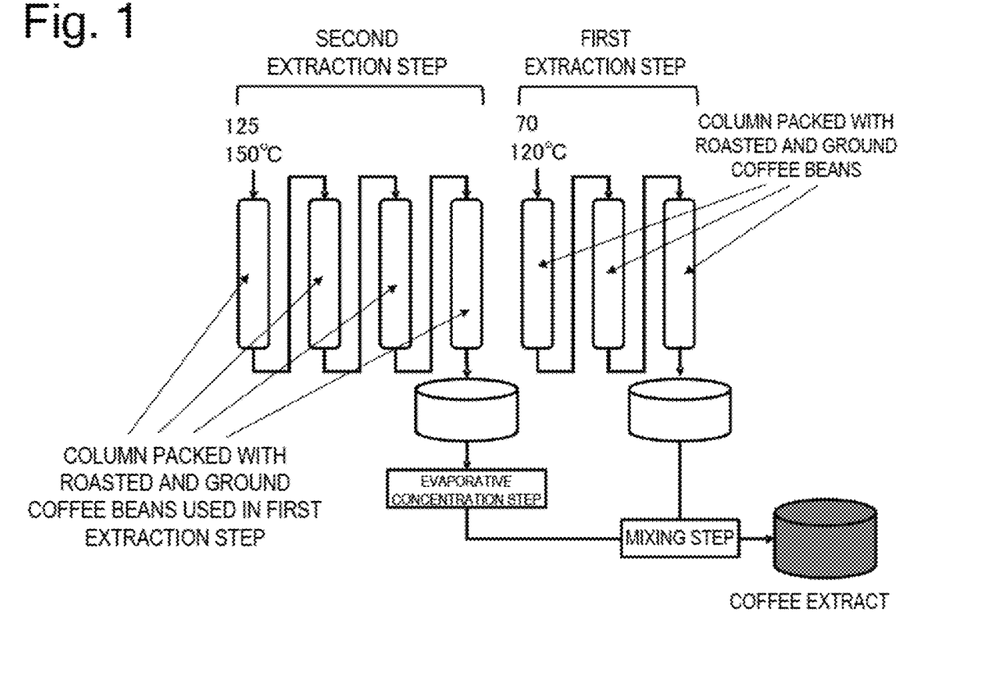
FIG. 1 is a schematic view illustrating the method for producing a coffee extract of the present invention in which a plurality of extraction columns are used in the first extraction step and the second extraction step, respectively.

The method for producing a coffee extract of the present invention includes the first extraction step of extracting a coffee extract at low temperature and the subsequent second extraction step of extracting a coffee extract at high temperature using the roasted and ground coffee beans which have been used in the first extraction step (FIG. 1).

The coffee-specific aromatic component is easily decomposed by heat, and thus it is preferable to perform extraction at low temperature using fresh roasted coffee beans to obtain a coffee extract containing a large amount of a coffee-specific aromatic component. To this end, the method for producing a coffee extract of the present invention includes, as the first extraction step, a step of preparing a coffee extract by supplying water at 70 to 120° C. to a column packed with roasted and ground coffee beans. The extraction temperature in the method for producing a coffee extract of the present invention is preferably 90 to 110° C., more preferably 95 to 105° C.

The capacity of the extraction column used in the first extraction step of the method for producing a coffee extract of the present invention is not particularly limited, and is preferably 10 to 50 L, more preferably 15 to 30 L and further preferably 20 to 25 L.

Furthermore, it is preferable to maintain the temperature of the column packed with roasted and ground coffee beans during extraction in the first extraction step of the method for producing a coffee extract of the present invention. The temperature of the column in the first extraction step is preferably 70 to 120° C., more preferably 90 to 110° C. and further preferably 95 to 105° C.

The rate for supplying water per 1 L of the capacity of the column packed with roasted and ground coffee beans in the first extraction step of the method for producing a coffee extract of the present invention is not particularly limited, and water is supplied thereto at a flow rate of preferably 1.0 to 10.0 kg/h, more preferably 2.0 to 7.0 kg/h, further preferably 3.0 to 5.0 kg/h per 1 L of the capacity of the column. In the present description, supplying water at a flow rate of 1.0 to 10.0 kg/h per 1 L of the capacity of the column means that when the capacity of the column to be used is 5 L, water is supplied to the column at a flow rate of 5.0 to 50.0 kg/h.

The extraction ratio for the coffee extract prepared in the first extraction step of the method for producing a coffee extract of the present invention is not particularly limited, and is preferably 10.0 to 23.0%, more preferably 12.0 to 21.0%, and further preferably 14.0 to 20.0%

The coffee solid concentration of the coffee extract prepared in the first extraction step of the method for producing a coffee extract of the present invention is not particularly limited, and is preferably 19.0 to 36.0%, more preferably 22.0 to 34.0%, and further preferably 25.0 to 32.0% in the Brix value.

The Brix value means a value obtained by converting the refractive index which is measured by using a Brix meter or a refractometer at 20° C. into mass/percentage by mass of a sucrose solution based on the ICUMSA (The international Commission for Uniform Methods of Sugar Analysis Ltd.) table. The Brix value indicates the content of soluble solid components in a drink. The unit is "Bx," "%" or "degree." A low Brix value of a drink means that the content of soluble solid components including carbohydrates is low in the drink.

It is preferable that in the first extraction step of the method for producing a coffee extract of the present invention, a plurality of extraction columns packed with roasted and ground coffee beans are serially connected to perform extraction continuously from the viewpoint of preparation of a coffee extract rich in coffee-specific aromatic components (FIG. 1). The number of extraction columns in the first extraction step is preferably 2 or more, more preferably 2 to 10, and particularly preferably 3 to 6. When a plurality of columns are used, for example, the extraction columns are sequentially replaced to extract a coffee extract continuously in such a manner that water at 70 to 120° C. is supplied to the first extraction column packed with roasted and ground coffee beans to obtain a coffee extract, and then the coffee extract obtained in the first extraction column is supplied to the second extraction column packed with roasted and ground coffee beans.

The capacity of the extraction column used in the method for producing the coffee extract of the present invention is not particularly limited. The packing density of roasted and ground coffee beans to be packed in the extraction column is also not particularly limited, and is preferably 0.20 to 0.50 kg/L (0.2 to 0.5 kg of swollen roasted and ground coffee beans per 1 L of the capacity of the column), more preferably 0.25 to 0.40 kg/L, and further preferably 0.28 to 0.35 kg/L in terms of the amount of swollen roasted and ground coffee beans.

Furthermore, the amount of the coffee extract collected from the extraction column varies depending on the capacity of the column and the amount of roasted and ground coffee beans packed in the column, and thus is not particularly limited, and is preferably 0.05 to 0.50 kg, more preferably 0.08 to 0.30 kg, and particularly preferably 0.10 to 0.20 kg per 1 L of the capacity of the column. As described above, while the present invention includes an embodiment in which extraction columns packed with roasted and ground coffee beans are serially connected to perform extraction continuously, the amount of coffee extract collected per 1 L of the capacity of the column refers to the amount collected per extraction column.

Figure 3:
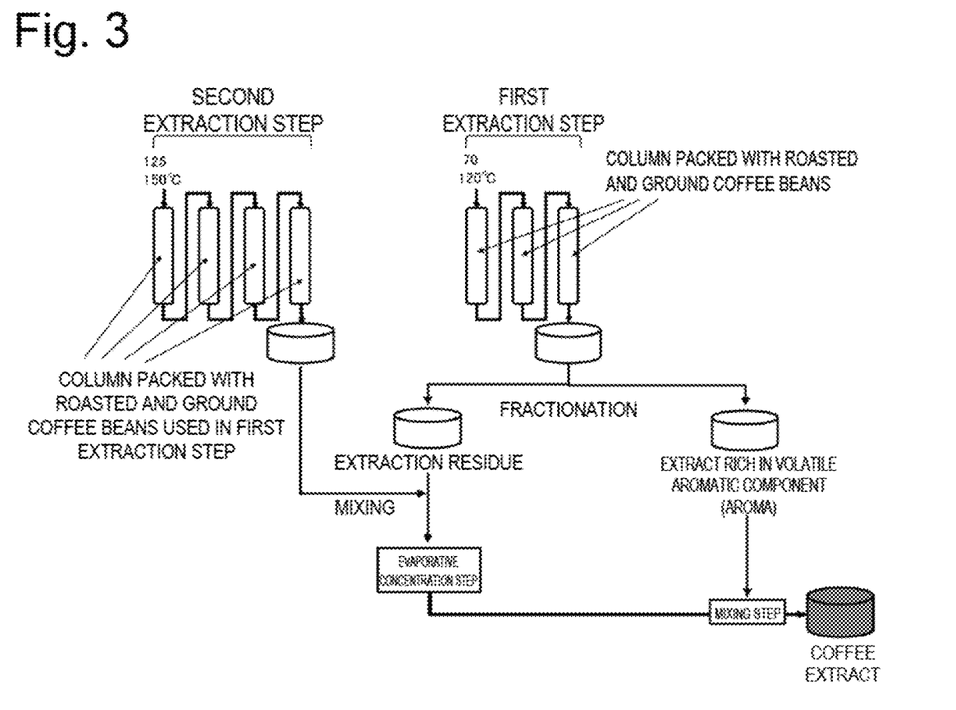
FIG. 3 is a view illustrating the method for producing a coffee extract of the present invention, in which the coffee extract prepared in the first extraction step is fractionated into an extract rich in a volatile aromatic component (aroma) and extract residue, and the resulting extract residue is mixed with the coffee extract prepared in the second extraction step and an evaporative concentration step is performed, and then the extract rich in a volatile aromatic component (aroma) is mixed with the evaporated and concentrated mixture.

In an embodiment, the coffee extract prepared in the first extraction step may be fractionated into an extract rich in a volatile aromatic component (aroma) and extract residue by using a method such as steam distillation, steam distillation under reduced pressure, distillation and distillation under reduced pressure, after the first extraction step (FIG. 3). Furthermore, the resulting extract residue may be mixed with the coffee extract prepared in the second extraction step after the second extraction step described later and the evaporative concentration step described later may be performed using the whole mixture (FIG. 3). Moreover, part or all of the extract rich in a volatile aromatic component (aroma) obtained in the fractionation step may be mixed with the evaporated and concentrated mixture to prepare the coffee extract according to the present invention. In such embodiments, a coffee extract richer in excellent coffee-specific aroma and having higher concentration can be produced.

1-4. Second Extraction Step

The method for producing a coffee extract of the present invention includes, after the first extraction step, the second extraction step in which water at a relatively high temperature is supplied to the column packed with roasted and ground coffee beans used in the first extraction step to prepare a coffee extract (FIG. 1).

The column packed with roasted and ground coffee beans used in the first extraction step is used in the second extraction step of the method for producing a coffee extract of the present invention. The extraction temperature in the second extraction step of the method for producing a coffee extract of the present invention is 125 to 150° C., preferably 125 to 140° C., and more preferably 125 to 135° C.

The capacity of the extraction column used in the second extraction step of the method for producing a coffee extract of the present invention is not particularly limited, and is preferably 10 to 50 L, more preferably 15 to 30 L and further preferably 20 to 25 L.

Furthermore, it is preferable to maintain the temperature of the column packed with roasted and ground coffee beans during extraction in the second extraction step of the method for producing a coffee extract of the present invention. The temperature of the column in the second extraction step is preferably 125 to 150° C., more preferably 125 to 140° C. and further preferably 125 to 135° C.

The rate for supplying water to the column packed with roasted and ground coffee beans per 1 L of the capacity of the column in the second extraction step of the method for producing a coffee extract of the present invention is not particularly limited, and water is supplied thereto at a flow rate of preferably 1.0 to 10.0 kg/h, more preferably 2.0 to 8.0 kg/h, and further preferably 4.0 to 6.0 kg/h per 1 L of the capacity of the column.

The extraction ratio for the coffee extract prepared in the second extraction step of the method for producing a coffee extract of the present invention is not particularly limited, and is preferably 4.0 to 14.0%, more preferably 6.0 to 12.0%, and further preferably 8.0 to 12.0%.

The coffee solid concentration of the coffee extract prepared in the second extraction step of the method for producing a coffee extract of the present invention is not particularly limited, and is preferably 0.3 to 3.0%, more preferably 0.5 to 2.5%, and further preferably 1.0 to 2.0% in the Brix value.

The Brix value means a value obtained by converting the refractive index which is measured by using a Brix meter or a refractometer at 20° C. into mass/percentage by mass of a sucrose solution based on the ICUMSA (The international Commission for Uniform Methods of Sugar Analysis Ltd.) table as described above. The Brix value indicates the content of soluble solid components in a drink.

The number of extraction columns used in the second extraction step is not particularly limited. It is preferable that a plurality of extraction columns packed with roasted and ground coffee beans are serially connected to perform extraction continuously from the viewpoint of preparation of coffee extract having high concentration (FIG. 1). The number of extraction columns in the second extraction step is preferably 2 or more, more preferably 2 to 10, and particularly preferably 3 to 6. When a plurality of extraction columns are used, for example, the extraction columns are sequentially replaced to extract a coffee extract continuously in such a manner that water at 125 to 150° C. is supplied to the first extraction column packed with roasted and ground coffee beans to obtain a coffee extract, and then the coffee extract obtained in the first extraction column is supplied to the second extraction column packed with roasted and ground coffee beans.

The capacity of the extraction column used in the method for producing a coffee extract of the present invention is not particularly limited. The packing density of roasted and ground coffee beans packed in the extraction column is also not particularly limited, and is preferably 0.2 to 0.5 kg/L, more preferably 0.25 to 0.40 kg/L, and further preferably 0.28 to 0.35 kg/L in terms of the amount of swollen roasted and ground coffee beans.

Furthermore, the amount of the coffee extract collected from the extraction column in the second extraction step is not particularly limited, and is preferably 0.5 to 5.0 kg, more preferably 0.8 to 3.0 kg, and particularly preferably 1.0 to 1.5 kg per 1 L of the capacity of the column.

1-5. Evaporative Concentration Step

The method for producing a coffee extract of the present invention includes, after the second extraction step, a step of evaporating and concentrating the coffee extract prepared in the second extraction step (FIG. 1).

Since the column packed with roasted and ground coffee beans used in the first extraction step is used in the second extraction step, the efficiency of extraction of coffee extract is not so high even when extraction is performed at high temperature. Furthermore, when coffee is extracted at high temperature, a large amount of off-flavor components is also included in the extract. Then, in the method for producing a coffee extract of the present invention, the concentration of the coffee extract is increased and off-flavor components are evaporated by evaporating and concentrating the coffee extract after the second extraction step, and thus off-flavors in the coffee extract can be reduced.

In the method for producing a coffee extract of the present invention, the concentration of the coffee extract after evaporative concentration is preferably 25 to 65%, more preferably 35 to 60%, and particularly preferably 45 to 58% in the Brix value.

The temperature of heating in the evaporative concentration step in the method for producing a coffee extract of the present invention is preferably 100 to 120° C., more preferably 105 to 115° C. and particularly preferably 108 to 112° C.

In an embodiment, the extraction residue fractionated from the coffee extract prepared in the first extraction step may be mixed with the coffee extract prepared in the second extraction step and then the mixture may be evaporated and concentrated (FIG. 3).

1-6. Mixing Step

The method for producing a coffee extract of the present invention includes a step of mixing the coffee extract prepared in the first extraction step with the coffee extract evaporated and concentrated after the second extraction step (FIG. 1). As described above, a coffee extract whose excellent coffee-specific aroma is maintained can be produced in the first extraction step by extracting at low temperature (70 to 120° C.). Furthermore, a coffee extract having high concentration with reduced off-flavors can be obtained by evaporative distillation after the second extraction step. Thus, by mixing the coffee extract prepared in the first extraction step and the coffee extract evaporated and concentrated after the second extraction step, a coffee extract with increased coffee-specific aroma and reduced off-flavors can be produced.

The ratio of mixing the coffee extract prepared in the first extraction step and the coffee extract evaporated and concentrated after the second extraction step in the method for producing the coffee extract of the present invention is not particularly limited. The coffee extract prepared in the first extraction step and the coffee extract evaporated and concentrated after the second extraction step are mixed so that the coffee extract after mixing has the desired Brix value. In the method for producing the coffee extract of the present invention, the concentration of the coffee extract prepared by mixing the coffee extract prepared in the first extraction step and the coffee extract evaporated and concentrated after the second extraction step is preferably 20 to 40%, more preferably 25 to 37%, and particularly preferably 30 to 35% in the Brix value.

In an embodiment, part or all of the extract rich in a volatile aromatic component (aroma) fractionated from the coffee extract prepared in the first extraction step may be mixed with an evaporated and concentrated mixture prepared by mixing the extraction residue fractionated from the coffee extract prepared in the first extraction step with the coffee extract prepared in the second extraction step to produce the coffee extract according to the present invention.

1-7. Other

The method for producing a coffee extract of the present invention may also include, after preparing a coffee extract in the second extraction step, discarding the extracted roasted and ground coffee beans in the column after preparing a coffee extract in the second extraction step, washing the column, and packing new roasted and ground coffee beans in the column after washing. Furthermore, the column packed with new roasted and ground coffee beans may be used in the subsequent first extraction step.

The method for producing a coffee extract of the present invention may also include a step of heat sterilization. When the method for producing a coffee extract of the present invention includes the step of heat sterilization, the method of heat sterilization is not particularly limited, and a known method such as FP and UHT sterilization may be used. For example, a method in which coffee extract itself is heat-sterilized and then packed in a container, or a method in which coffee extract is packed in a container and then heat-sterilized may be used to produce heat-sterilized coffee extract.

The method for producing a coffee extract of the present invention may also include a step of freezing where necessary.

2. Method for Increasing Coffee-Specific Aroma and Reducing Off-Flavors in a Coffee Extract In an embodiment, the present invention includes a method for increasing coffee-specific aroma and reducing off-flavors in a coffee extract, comprising a) a first extraction step in which water at 70 to 120° C. is supplied to a column packed with roasted and ground coffee beans to prepare a coffee extract; b) a second extraction step in which water at 125 to 150° C. is supplied to the column packed with roasted and ground coffee beans used in the first extraction step to prepare a coffee extract; c) a step of evaporating and concentrating the coffee extract prepared in the second extraction step; and d) a step of mixing the coffee extract prepared in the first extraction step with the evaporated and concentrated coffee extract. This makes it possible to produce a coffee extract with increased coffee-specific aroma and reduced off-flavors.

In the above method for increasing coffee-specific aroma and reducing off-flavors in a coffee extract, details of the roasted and ground coffee beans, the first extraction step, the second extraction step, the evaporative concentration step and the mixing step are as described in the section of ". Method for producing coffee extract." The method for increasing coffee-specific aroma and reducing off-flavors in a coffee extract described above may also include discarding the extracted roasted and ground coffee beans in the column after preparing a coffee extract in the second extraction step, washing the column, and packing new roasted and ground coffee beans in the column after washing. Furthermore, the column packed with new roasted and ground coffee beans described above may be used in the subsequent first extraction step.

In an embodiment, the coffee extract prepared in the first extraction step may be fractionated into an extract rich in a volatile aromatic component (aroma) and extract residue by using a method such as steam distillation, steam distillation under reduced pressure, distillation and distillation under reduced pressure, after the first extraction step (FIG. 3). Furthermore, the resulting extract residue may be mixed with the coffee extract prepared in the second extraction step after the second extraction step and the evaporative concentration step may be performed using the mixture (FIG. 3). Moreover, part or all of the extract rich in a volatile aromatic component (aroma) obtained in the fractionation step may be mixed with the evaporated and concentrated mixture. Such embodiments make it possible to increase coffee-specific aroma and reduce off-flavors in a coffee extract.

EXAMPLES

The present invention will be described in more detail with reference to Examples, but the present invention is not limited thereto.

1. Example 1

(1) Production of Roasted and Ground Coffee Beans

Raw coffee beans (made in Brazil, Arabica variety) were roasted by a coffee roaster (made by Probat) so that the L value was 20. Then, the roasted coffee beans were ground by a roller mill (made by GEA) to give roasted and ground coffee beans.

(2) Production of Coffee Extract (i) First Extraction Step

The roasted and ground coffee beans produced in the above (1) were swollen with water (20% by weight) and the beans were packed in an extraction column (made by GEA, capacity 23 L) so that the weight of the beans was 7.0 kg % column. Then, water at 100° C. was supplied to the column at an extraction temperature of 100° C. and a flow rate of 80 kg/hour, and extraction was performed so that the amount of liquid collected was 3 kg. Next, roasted and ground coffee beans were packed in the second column so that the weight of beans after swelling was 7.0 kg, column, and extraction was performed with the two columns connected so that the amount of liquid collected was also 3 kg. Furthermore, roasted and ground coffee beans were packed in the third column so that the weight of beans after swelling was 7.0 kg/column, and extraction was performed with the three columns connected so that the amount of liquid collected was also 3 kg. The beans in the first column after three times of extraction were sent to the step for collecting the second extract. Roasted and ground coffee beans were freshly packed in the fourth column so that the weight of beans after swelling was 7.0 kg/column, and extraction was performed with the three columns connected so that the amount of liquid collected was also 3 kg. These extraction steps were repeated (batches 1 to 18), and the extracts of batches 10 to 18 which provided stable extraction ratios and Brix values were mixed to give a coffee extract after the first extraction step. The results of measurements of the respective batches are shown in Table 1. The final amount of the coffee extract after the first extraction step was 29.82 kg, Brix was 29.21% and the average extraction ratio was 17.92%.

TABLE 1

| | First extraction step | | | Second extraction step | | | Total |
|---|---|---|---|---|---|---|---|
| Batch | Amount of liquid [kg] | Brix[%] | Extraction ratio [%] | Amount of liquid [kg] | Brix[%] | Extraction ratio [%] | extraction ratio [%] |
| 1 | 3.11 | 0.13 | 0.07 | | | 0 | 0.07 |
| 2 | 3.22 | 5.03 | 3.00 | | | 0 | 3.00 |
| 3 | 3.23 | 9.36 | 5.60 | | | 0 | 5.60 |
| 4 | 3.27 | 13.41 | 8.12 | 25.78 | 0.30 | 1.43 | 9.55 |
| 5 | 3.26 | 15.38 | 9.28 | 25.91 | 0.58 | 2.78 | 12.07 |
| 6 | 3.32 | 18.81 | 11.56 | 27.55 | 1.08 | 5.51 | 17.07 |
| 7 | 3.3 | 20.31 | 12.41 | 27.31 | 1.31 | 6.63 | 19.04 |
| 8 | 3.31 | 22.14 | 13.57 | 26.88 | 1.58 | 7.86 | 21.44 |
| 9 | 3.31 | 23.08 | 14.15 | 27.79 | 1.72 | 8.85 | 23.00 |
| 10 | 3.34 | 25.12 | 15.54 | 26.62 | 1.85 | 9.12 | 24.66 |
| 11 | 3.36 | 26.43 | 16.45 | 25.76 | 1.93 | 9.21 | 25.65 |
| 12 | 3.17 | 28.99 | 17.02 | 27.36 | 2.01 | 10.18 | 27.20 |
| 13 | 3.43 | 29.78 | 18.92 | 26.90 | 1.90 | 9.46 | 28.38 |
| 14 | 3.26 | 30.10 | 18.17 | 28.26 | 1.85 | 9.68 | 27.86 |
| 15 | 3.44 | 30.07 | 19.16 | 28.08 | 1.70 | 8.84 | 28.00 |
| 16 | 3.27 | 31.42 | 19.03 | 27.95 | 1.66 | 8.59 | 27.62 |
| 17 | 3.3 | 30.05 | 18.36 | 28.15 | 1.66 | 8.65 | 27.02 |
| 18 | 3.25 | 30.94 | 18.62 | 28.66 | 1.64 | 8.70 | 27.33 |

(ii) Second Extraction Step

At most the 4 columns packed with roasted and ground coffee beans used in the first extraction step of the above (i) were serially connected. Then water at 130° C. was supplied to the columns so that the extraction temperature was 130° C. and the flow rate was 120 kg/hour. Extraction was performed so that the amount of liquid collected was 25 kg and the target extraction ratio was 10%. The beans were discharged from the column when 4 times of extraction was completed, and new beans were packed in the column and freshly used in the first extraction step. These extraction steps were repeated (batches 4 to 18; no second extraction step in batches 1 to 3 because the first extraction step was not completed), and the extracts of batches 10 to 18 which provided stable extraction ratios and Brix values were mixed to give a coffee extract after the second extraction step. The results of measurements of the respective batches are shown in Table 1. The final amount of the coffee extract after the second extraction step was 247.74 kg, Brix was 1.80% and the average extraction ratio was 9.16%.

(iii) Step of Evaporative Distillation

About 250 kg of the coffee extract after the second extraction step obtained in the above (ii) was concentrated at a heating temperature of 110° C. and an evaporation temperature of 50° C. so that the coffee solid concentration in the extract was 50%. The amount after evaporative distillation of the coffee extract after the second extraction step obtained in the above (ii) was 5.62 kg and Brix was 55.18%.

(iv) Preparation of Sample for Sensory Evaluation Test

Example 1

1.0 kg of the coffee extract prepared in the first extraction step of the above (i) was mixed with 0.297 kg of the coffee extract prepared by evaporative concentration of the coffee extract prepared in the second extraction step of the above (iii) to prepare a sample of Example 1 (continuous multi-tube, concentration performed). The amount of the sample of Example 1 was 12.9 kg and Brix was 34.0%.

Comparative Example 1

1.0 kg of the coffee extract prepared in the first extraction step of the above (i) was mixed with 8.3 kg of the coffee extract prepared in the second extraction step of the above (ii) to prepare a sample of Comparative Example 1 (continuous multi-tube, no concentration). The amount of the sample of Comparative Example 1 was 9.3 kg and Brix was 4.75%.

Comparative Example 2

The roasted and ground coffee beans prepared in the above (1) were drip-extracted in an extraction column to prepare a sample of Comparative Example 2 (drip). The amount of the sample of Comparative Example 2 was 100 g and Brix was 1.7%.

(3) Sensory Evaluation Test of Coffee Extract

Next, Example 1, Comparative Example 1 and Comparative Example 2 prepared in the above (2) were diluted with hot water, respectively, so that Brix was 1.3 to give a sample drink for sensory evaluation test. Then sensory evaluation of the sample drinks was performed by expert panelists (four panelists). In the sensory evaluation, the expert panelists drunk 30 mL of the respective sample drinks and gave scores of 0 to 100 for the coffee-specific aroma and off-flavors.
<Evaluation Criteria>
  70 to 100 points: strong coffee-specific aroma felt without little off-flavor
  50 to 69 points: some coffee-specific aroma felt with a little off-flavor
  30 to 59 points: a little coffee-specific aroma felt with off-flavor
  0 to 29 points: little coffee-specific aroma felt with strong off-flavor.

Figure 2:
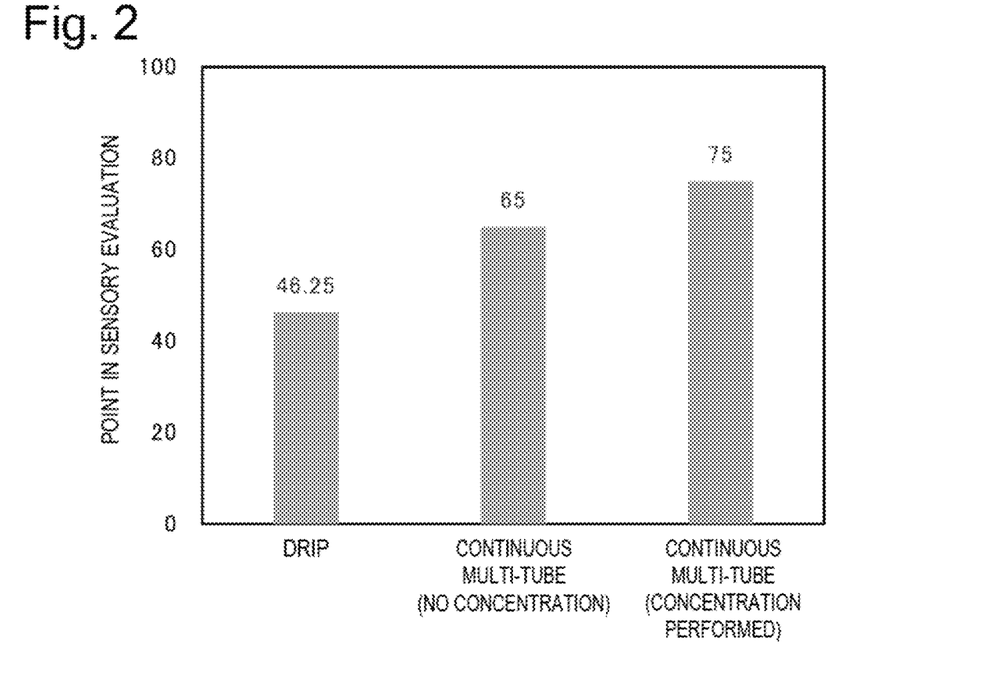
FIG. 2 shows the results of a sensory evaluation test of a coffee extract prepared by drip extraction, continuous multi-tube extraction (no concentration), and continuous multi-tube extraction (concentration performed).

The results of evaluation are shown in Table 2 and FIG. 2. Table 2 and FIG. 2 clearly show that a coffee extract with increased coffee-specific aroma and reduced off-flavors can be prepared when a coffee extract is produced by the method of the present invention.

TABLE 2

| | Drip | Continuous multi-tube (no concentration) | Continuous multi-tube (concentration performed) |
|---|---|---|---|
| Panelist 1 | 65.0 | 60.0 | 75.0 |
| Panelist 2 | 45.0 | 65.0 | 70.0 |
| Panelist 3 | 25.0 | 80.0 | 75.0 |
| Panelist 4 | 50.0 | 55.0 | 80.0 |
| Average | 46.3 | 65.0 | 75.0 |

2. Production Example 1

In the method for producing a coffee extract of the present invention, the coffee extract prepared in the first extraction step may be fractionated into an extract rich in a volatile aromatic component (aroma) and extract residue by using a method such as steam distillation, steam distillation under reduced pressure, distillation and distillation under reduced pressure as shown in FIG. 3. Furthermore, the resulting extract residue may be mixed with the coffee extract prepared in the second extraction step and the mixture may be evaporated and concentrated (FIG. 3). Moreover, part or all of the extract rich in a volatile aromatic component (aroma) obtained in the above fractionation step may be mixed with the evaporated and concentrated mixture to prepare the coffee extract according to the present invention.

INDUSTRIAL APPLICABILITY

The present invention relates to a novel means for providing a coffee extract with increased coffee-specific aroma and reduced off-flavors, and thus is highly industrially applicable.

The invention claimed is:

1. A method for producing a coffee extract, comprising:
   a) a first extraction step in which water at 70 to 120° C. is supplied to a column packed with roasted and ground coffee beans at a first flow rate of 1.0 to 10.0 kg/h per 1 L of the capacity of the column to prepare 0.05 to 0.50 kg of a first coffee extract per 1 L of the capacity of the column;
   a') a step of fractionating the first coffee extract into an extract rich in a volatile aromatic component (aroma) and extraction residue;
   b) a second extraction step in which water at 125 to 150° C. is supplied to the column packed with roasted and ground coffee beans used in the first extraction step at a second flow rate of 1.0 to 10.0 kg/h per 1 L of the capacity of the column to prepare 0.5 to 5.0 kg of a second coffee extract per 1 L of the capacity of the column;
   b') a step of mixing the extraction residue with the second coffee extract, thereby obtaining a first mixture;
   c) a step of evaporating and concentrating the first mixture prepared in the step b'), thereby obtaining a second mixture; and
   d) a step of mixing the extract prepared in the step a') with the second mixture prepared in the step c), wherein part or all of the extract rich in the volatile aromatic component (aroma) obtained in the step a') is mixed with the second mixture, thereby obtaining the coffee extract.

2. The method according to claim 1, wherein the column used in the first extraction step is a plurality of columns serially connected.

3. The method according to claim 1, wherein the extraction temperature in the first extraction step is 90 to 110° C.

4. The method according to claim 1, wherein the column used in the second extraction step is a plurality of columns serially connected.

5. The method according to claim 1, wherein the extraction temperature in the second extraction step is 125 to 140° C.

6. The method according to claim 1, further comprising: after preparing a coffee extract in the step, discarding the extracted roasted and ground coffee beans in the column; washing the column; and packing new roasted and ground coffee beans in the column after washing, wherein the column packed with new roasted and ground coffee beans is used in a subsequent first extraction step.

* * * * *